June 15, 1948.    H. R. GREENLEE    2,443,501
LOCK RETAINER FOR BEARINGS
Filed Aug. 3, 1944

INVENTOR.
BY Harry R. Greenlee
Brown, Jackson, Boettcher & Dienner
ATTORNEYS.

Patented June 15, 1948

2,443,501

UNITED STATES PATENT OFFICE 2,443,501

LOCK RETAINER FOR BEARINGS

Harry R. Greenlee, South Bend, Ind., assignor to The Studebaker Corporation, South Bend, Ind., a corporation of Delaware Application August 3, 1944, Serial No. 547,868

4 Claims. (Cl. 308—236)

This invention relates, in general, to anti-friction bearings, and has particular relation to a lock retainer for locking the bearing, and particularly the outer race thereof, against axial displacement.

While the particular bearings which I shall describe hereinafter in connection with the drawing are snap-ring ball bearings of the radial load type, it is to be understood that the invention is not limited to use with the particular forms of bearings shown and described, but may be employed with other forms of bearings or various types of collars and elsewhere as desired.

In bearings of the type with which the present invention is particularly concerned, offsets, shoulders, cap members, snap rings, or other means have been required beyond the end of the bearing for securing same against axial displacement. With provisions such as these, the device with which the bearings are used—such, for example, as an automotive transmission—cannot be made as compact as otherwise would be possible. Also, where offsets, shoulders, cap members, snap rings or other means are required beyond the end of the bearing to lock the same axially, it is impossible to bring, for example, gears or other parts up as close to the bearing as desired.

One of the main objects of the present invention is to provide an improved form of lock retainer which, when in locking position, is confined within the length of the bearing and requires no offsets, shoulders, cap members, snap rings or other means beyond the end of the bearing for locking same axially, thereby enabling bringing gears and other parts up closer to the bearing and greater compactness in the device with which the bearing is used.

Another object of the invention is to provide a lock retainer for preventing end play in a bearing or any other type of collar without the use of conventional snap rings, covers, cap members or the like.

Another object of the invention is to provide a lock retainer of the class described having a snap-ring for wedging or binding engagement with the groove in the bearing race or collar and a lock retainer in which the parts thereof are self-retained when the snap ring is in locking position.

Another object of the invention is to provide a lock retainer which is simple and compact, and adapted to be conveniently set into and released from locking position.

Another object of the invention is to provide an improved form of lock retainer comprising a split spring snap-ring which is normally expanded into a groove in the bearing boss clear of the outer race of the bearing, and is adapted to be contracted into a registering groove in the periphery of the outer race of the bearing to lock the bearing axially; also improved means carried by the bearing boss for contracting the snap-ring into and holding same in the groove in the outer race of the bearing.

Another object of the invention is to provide and improved form of lock retainer in which the members for contracting the snap ring to locking position are carried by and held against displacement from the bearing boss.

In one form of the invention the lock retainer is set into and released from locking position by turning movement of the locking members and, more particularly, by eccentric means actuated by turning movement of the locking members, whereas in another form of the invention the lock retainer is set into and released from locking position by screwing the locking members into and from the bearing boss. In a further form of the invention, the lock retainer is set into locking position by endwise movement in one direction, and released by endwise movement in the opposite direction, and, in a still further form of the invention, the lock retainer is set and released by endwise movement in either direction.

In order to acquaint those skilled in the art with the manner of constructing and operating several embodiments of the invention, I shall describe in connection with the accompanying drawing certain preferred embodiments of the invention.

Figure 1:
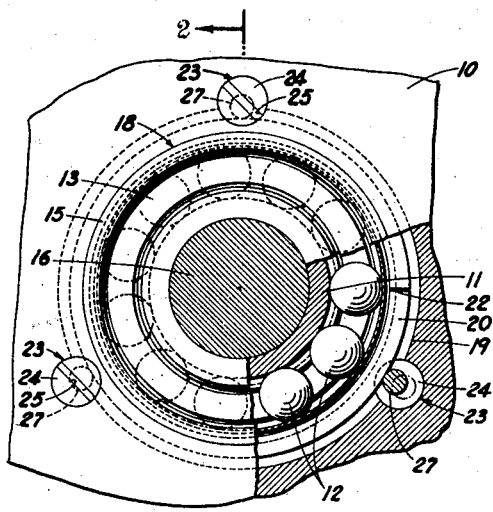
Figure 1 is a fragmentary end view, partially broken away and partially in section, showing a bearing mounted in a bearing boss and provided with a lock retainer embodying the present invention.
Figure 2:
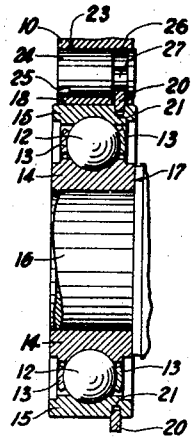
Figure 2 is a sectional view taken substantially on the line 2—2 of Figure 1.

Referring first to Figures 1 and 2 of the drawing, the reference character 10 designates a boss, wall, partition, or similar part in which the bearing 11 is positioned. This part 10 will be referred to herein and in the appended claims as the bearing boss.

The bearing 11 comprises the ball members 12 provided with ball retainer means 13 and interposed between grooved inner and outer races 14 and 15. The inner race 14 is mounted on the shaft 16 and held or clamped, for example, between a shoulder 17 on the shaft 16 and a snap-ring, nut, or other retainer means (not shown), as well understood in the art. The outer race 15 is mounted in the opening 18 in the bearing boss 10.

The boss 10 has a circumferential groove 19 extending outwardly into the boss from the periphery of the opening 18, into which groove 19 a spring snap-ring 20 is inserted. The outer race 15 has a circumferential groove 21 in its outer periphery which is adapted for registry with the groove 19. The snap-ring 20 is split at 22 and is normally expanded by its own resilience into the groove 19 in the boss 10 and clear of the groove 21 in the outer race of the bearing.

The boss 10 has a plurality (three in the illustrated embodiment of the invention) of openings 23 spaced circumferentially and equi-distant above the opening 18 and intersecting the groove 19, as best shown in Figure 1. Cylindrical locking members 24 are mounted in the openings 23, and each of these members 24 has a transverse groove or kerf 25 in its outer end for turning the members 24 in their respective openings 23. Adjacent the outer periphery of the snap-ring 20 each member 24 is grooved or reduced at 26 to form eccentrically disposed integral portions or pins 27.

In its expanded position the snap-ring 20 engages in the grooved or reduced portions 26 of the locking members 24, thereby holding these members 24 against displacement endwise from the openings 23. The locking members 24 preferably have full diameter portions at each of the opposite ends of the grooved or reduced portion 26 for proper support in the openings 23, although this may, of course, vary.

The outer race of the bearing is locked against axial displacement by engaging a screw driver or other suitable tool in the grooves or kerfs 25 and turning the locking members 24 in the openings 23 until the eccentric portions 27 are moved from the position shown in dotted lines in the sectional portion of Figure 1, to the position shown in full lines in the same figure. This movement of the eccentric portions 27 from the dotted to the full line positions (Figure 1) presses or contracts the snap-ring 20 into the groove 21 in the outer race 15 of the bearing to lock said race against axial displacement. So long as the eccentric portions 27 are in their full line or inner positions they hold the snap ring 20 in the groove 21 in the outer race 15.

Release of the snap-ring 21 is accomplished by applying the screw driver or the like and turning the locking members 24 to return the eccentric portions 27 thereof from the positions shown in full lines in the sectional portion of Figure 1 to the positions shown in dotted lines. As the eccentric portions 27 move to their dotted line or outer positions, the split spring snap-ring 20 expands into the groove 19 in the boss 10 and clear of the groove 21 in the outer race of the bearing. This permits the outer race of the bearing to be inserted endwise into or removed endwise from the opening 18 in the boss 10.

In the above described embodiment of the invention the entire lock retainer is at all times confined within the length of the bearing. It requires no offsets, shoulders, cap members, snap-rings or other means beyond the end of the bearing for locking same axially. This enables bringing gears and other parts up closer to the bearing and greater compactness in the device with which the bearing is used. Moreover, the lock retainer is simple and compact, and is adapted to be conveniently set into and released from locking position. The engagement of the snap-ring 20 in the reduced or grooved portions 26 of the locking members 24 holds the locking members against endwise displacement from the bearing boss.

Figure 3:
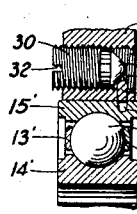
Figure 3 is a fragmentary sectional view showing another form of lock retainer with the locking means and snap-ring in released position.
Figure 4:
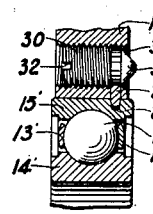
Figure 4 is a fragmentary sectional view of the form of lock retainer shown in Figure 3, with the locking means and snap-ring in locking position.

In the embodiment of the invention shown in Figures 3 and 4, the bearing boss, as well as the inner and outer races and the snap-ring; also the ball members and the ball retainer means, are similar to the corresponding parts shown in Figures 1 and 2 and are designated by primed reference characters corresponding with the reference characters employed in Figures 1 and 2. In this form of the invention, however, the locking members, instead of being in the form of cylindrical members provided with reduced eccentric portions, are in the form of screws 30 screwed into threaded openings 31 in the bearing boss 10'.

The screws 30 have kerfs or grooves 32 at their outer ends, and the inner ends of the screws are tapered at 33 to engage, upon screwing the screws 30 into the bearing boss 10', the outer periphery of the split spring snap-ring 20' to contract this ring into the groove 21' in the outer race 15' of the bearing and to hold same in this groove, as shown in Figure 4. As before, this locks the outer race of the bearing against axial displacement. Release of the snap-ring 20' is accomplished by screwing the screws 30 from the bearing boss 10' to approximately the position shown in Figure 3. As the tapered inner ends 33 of the screws move outwardly away from the outer periphery of the snap-ring 20', this ring expands into the groove 19' in the boss 10' and clear of the groove 21' in the outer race of the bearing. The lock retainer, when in locking position, is confined entirely within the length of the bearing.

Figure 5:
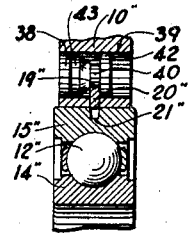
Figure 5 is a view similar to Figure 3 of another form of lock retainer with the locking means and snap-ring in released position.
Figure 6:
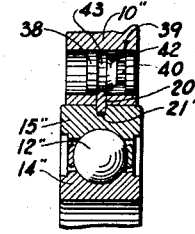
Figure 6 is a fragmentary sectional view of the form of lock retainer shown in Figure 5, with the locking means and snap-ring in locking position.

In the embodiment of the invention shown in Figures 5 and 6, the locking members 38 are movable endwise in openings 39 in the bearing boss 10" and have cylindrical end portions having driving fit in the openings 39. Between the cylindrical end portions the locking members 38 have integral reduced cylindrical portions 40 which, when positioned as shown in Figure 5, permit the split spring snap-ring 20" to expand into the groove 19" in the boss 10" clear of the groove 21" in the outer race 15" of the bearing.

Also, between the cylindrical end portions of the locking member 38 and adjacent the reduced part 40, each locking member 38 has an integral tapered portion 42. By forcing the locking member to the right from the position shown in Figure 5 to the position shown in Figure 6, the tapered portion 42 presses or contracts the ring 20" into the groove 21" in the outer race 15", and the cylindrical portion 43 at the larger end of the tapered portion 42, by assuming the position shown in Figure 6, locks the ring 20" in contracted position and the outer race 15" of the bearing against axial displacement. Release of the snap-ring 20" is accomplished by forcing the locking members 38 in the opposite direction from the positions shown in Figure 6 to the positions shown in Figure 5. As the reduced portion 40 of the locking member assumes the position shown in Figure 5, the ring 20" expands into the groove 19" in the boss 10" and clear of the groove 21" in the outer race of the bearing.

Figure 7:
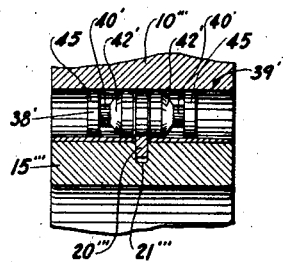
Figure 7 is a fragmentary sectional view showing a further form of lock retainer with the locking means and snap-ring in locking position.

The embodiment of the invention shown in Figure 7 is similar to the embodiment shown in Figures 5 and 6 except that the locking member 38', which is movable endwise in the opening 39' in the bearing boss 10''', has not only the cylindrical end portions 45 in driving fit with the opening 39', but a pair of reduced cylindrical portions 40', and, between these reduced portions 40', a pair of oppositely tapered portions 42'.

In this last mentioned embodiment of the invention the snap-ring 20''' may be released by forcing the member 38' either to the right or to the left from the position shown in Figure 7, until either of the reduced portions 40' registers with the snap-ring 20''', whereupon, as before, this ring will expand into the groove in the bearing boss and clear of the groove in the outer race 15''' of the bearing. With the reduced portion 40' at the right hand end of the member 38' in register with the snap-ring 20''', the ring is pressed inwardly or contracted to secure the race 15''' axially by forcing the member 38' to the right as the device is viewed in Figure 7. With the reduced portion 40' at the left hand end of the member 38' in register with the snap ring 20''', the ring is pressed inwardly or contracted to secure the race 15''' axially by forcing the member 38' to the left, as the device is viewed in Figure 7. One of the tapered portions 42' contracts the ring 20''' upon movement of the locking member in one direction, and the other tapered portion contracts the ring upon movement of the locking member in the other direction.

In the embodiments of the invention illustrated in Figures 2, 3, 4, 5, and 6, the inner part of the split snap-ring is of tapered cross section for taper fit with the tapered cross sectional form of the groove in the outer race of the bearing. The tapered inner part of the snap-ring thus has wedging or binding engagement with the groove in the outer race of the bearing so that no end play can result.

In the embodiments of the invention illustrated in Figures 2, 5, 6, and 7, the parts of my improved lock retainer are self-retaining. The engagement of the snap-ring in the reduced or grooved portion of the locking members 24 in Figure 2, and the engagement of the snap-ring between the enlarged end portions of the locking members in Figures 5, 6, and 7, retain the locking members against endwise displacement, and the locking members prevent displacement of the snap-ring until the snap-ring is expanded to released position.

I do not intend to be limited to the precise details or to the precise modifications shown and described, as variations in the details and other modifications are contemplated within the scope of the appended claims.

I claim:

1. In combination, a bearing boss having an opening defined by a substantially continuous cylindrical surface provided with a groove extending outwardly into the boss from the periphery of the surface defining said opening, an anti-friction bearing comprising an outer race having a substantially continuous cylindrical surface of substantially the same diameter as the cylindrical surface of said opening adapted to be positioned in the opening in said boss and having a groove in its outer periphery extending inwardly of the surface of said outer race for registry with the groove in said boss, a split spring snap-ring normally expanded into the groove in the boss clear of the cylindrical surface of the outer race of the bearing, said boss having a plurality of circumferentially spaced openings, and locking members having driving fit at opposite ends in said latter openings, said locking members having reduced portions for receiving the snap ring when expanded clear of the cylindrical surface of the outer race of the bearing and tapered portions adapted by endwise movement of said locking members in said openings to engage the snap-ring to contract said ring into and to hold same in the groove in the outer race of the bearing to lock said race against axial displacement.

2. In combination, a bearing boss having an opening provided with a groove extending outwardly into the boss from the periphery of the opening, an anti-friction bearing comprising an outer race adapted to be positioned in the opening in said boss and having a groove in its outer periphery for registry with the groove in said boss, a split spring snap-ring normally expanded into the groove in the boss clear of the groove in the outer race of the bearing, said boss having a plurality of circumferentially spaced openings, and locking members having driving fit at opposite ends in said openings, said locking members each having a pair of reduced portions for receiving the snap-ring when expanded clear of the groove in the outer race of the bearing, and a pair of oppositely tapered portions between said reduced portions for engaging the snap-ring by movement of the locking members in either direction to contract said ring into and to hold same in the groove in the outer race of the bearing to lock said race against axial displacement.

3. In combination, a bearing boss having an opening provided with a groove extending outwardly into the boss from the periphery of the opening, an anti-friction bearing comprising an outer race adapted to be positioned in the opening in said boss and having a groove in its outer periphery for registry with the groove in said boss, a split spring snap-ring normally expanded into the groove in the boss clear of the groove in the outer race of the bearing, said boss having a locking opening spaced outwardly of said first opening, a locking member adapted to fit in said locking opening provided with a reduced portion between the ends thereof adapted to engage said snap-ring to contract the same into the groove in the outer race of the bearing to hold same in the groove in the outer race of the bearing to lock said race against axial displacement, said snap ring in its engaged position having a portion thereof extending inwardly of said locking member beyond the periphery of the opposite ends of the latter to prevent removal of said locking member axially of said locking opening.

4. In combination, a bearing boss having an opening provided with a groove extending outwardly into the boss from the periphery of the opening, an anti-friction bearing comprising an outer race adapted to be positioned in the opening in said boss and having a groove in its outer periphery for registry with the groove in said boss, a split spring snap-ring normally expanded into the groove in the boss clear of the groove in the outer race of the bearing, said boss having a locking opening spaced outwardly of said first opening, a locking member operable endwise in said locking opening to contract said snap ring into and to hold said ring in the groove in the outer race of the bearing to lock same against axial displacement, and said locking member having means adapted to be engaged by said snap-ring in its locked position to prevent movement of said locking member axially out of said locking opening.

HARRY R. GREENLEE.

REFERENCES CITED

The following references are of record in the file of this patent:

UNITED STATES PATENTS

| Number | Name | Date |
|---|---|---|
| 1,255,378 | Beach | Feb. 5, 1918 |
| 1,611,912 | Hleb | Dec. 28, 1926 |
| 1,734,236 | Smith | Nov. 5, 1929 |
| 1,908,295 | Leister | May 9, 1933 |
| 2,051,709 | Harris | Aug. 18, 1936 |
| 2,052,108 | Okner | Aug. 25, 1936 |
| 2,058,235 | Griswold | May 16, 1939 |